United States Patent
Kristinsson et al.

(10) Patent No.: US 11,321,367 B2
(45) Date of Patent: May 3, 2022

(54) GEOSHORTCUTS

(71) Applicant: FORD GLOBAL TECHNOLOGIES, LLC, Dearborn, MI (US)

(72) Inventors: Johannes Geir Kristinsson, Ann Arbor, MI (US); John Michael Galan Ferrer, San Jose, CA (US); Nithya Somanath, Farmington Hills, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 376 days.

(21) Appl. No.: 16/670,157

(22) Filed: Oct. 31, 2019

(65) Prior Publication Data

US 2021/0133219 A1 May 6, 2021

(51) Int. Cl.

| | |
|---|---|
| G06F 3/12 | (2006.01) |
| H04W 4/021 | (2018.01) |
| G06F 16/29 | (2019.01) |
| H04L 67/52 | (2022.01) |
| H04W 4/02 | (2018.01) |
| H04W 4/18 | (2009.01) |
| G06F 40/12 | (2020.01) |

(52) U.S. Cl.
CPC .............. *G06F 16/29* (2019.01); *G06F 40/12* (2020.01); *H04L 67/18* (2013.01); *H04W 4/021* (2013.01); *H04W 4/026* (2013.01); *H04W 4/185* (2013.01)

(58) Field of Classification Search
USPC ........................................................ 707/758
See application file for complete search history.

(56) References Cited

U.S. PATENT DOCUMENTS

| | | | | |
|---|---|---|---|---|
| 6,639,615 | B1 * | 10/2003 | Majumdar | G06F 16/10 |
| | | | | 715/839 |
| 8,340,726 | B1 * | 12/2012 | Fujisaki | G06F 3/0482 |
| | | | | 455/566 |
| 9,060,246 | B1 * | 6/2015 | Fujisaki | H04W 4/021 |
| 2009/0198954 | A1 | 8/2009 | Sanders | |
| 2009/0234570 | A1 | 9/2009 | Sever | |
| 2013/0339439 | A1 * | 12/2013 | Deng | H04W 4/02 |
| | | | | 709/204 |
| 2018/0173479 | A1 * | 6/2018 | Kurabe | H04L 67/025 |

* cited by examiner

*Primary Examiner* — Jude Jean Gilles
(74) *Attorney, Agent, or Firm* — Michael J. Spenner; Brooks Kushman P.C.

(57) ABSTRACT

An indication of a physical location specified as a name of a geoshortcut is received. The name is identified as corresponds to the geoshortcut according to a format of the name matching a format of geoshortcut name identifiers. The name is sent, to a cloud server maintaining a geoshortcut service, in a request for geoshortcut information regarding the geoshortcut. The geoshortcut information regarding the geoshortcut is received from the cloud server responsive to the request, the geoshortcut information including data identifying the physical location in a native format as received, data identifying the physical location in a predefined location format available across geoshortcuts, and expiration data indicative of for how long the data identifying the physical location is deemed valid. The geoshortcut information is utilized to determine the physical location referenced by the name of the geoshortcut.

20 Claims, 4 Drawing Sheets

GEOSHORTCUTS

TECHNICAL FIELD

The present disclosure relates to an application-agnostic, global, standardized way to define and share locations, independent of application or device.

BACKGROUND

In a mobile world, there is a desire to share precise location information. Not merely where a grocery store is, but where the gas station of the store is, or what side of an intersection a taco truck can be found. There are numerous ways to define location, many of which are lengthy or imprecise (e.g., a postal address) or difficult to remember (e.g., global positioning coordinates). Some devices and applications that use locations have their own proprietary ways of communicating the location information. Efforts have been made to simplify the sharing of location, such as Open Location Code (originally "Google Plus Codes") or What3Words. However, these efforts still have limitations.

SUMMARY

In one or more illustrative examples, a system for sharing location information includes a client device having a processor and a memory storing a location application. The processor executes the location application to perform operations including to receive an indication of a physical location specified as a name of a geoshortcut, and to send a request for geoshortcut information to a cloud server maintaining a geoshortcut service, the request including the name. The processor also receives the information regarding the geoshortcut from the cloud server responsive to the request, the information including data identifying the physical location in a native format as received to the geoshortcut service, data identifying the physical location in a predefined location format available across geoshortcuts, and expiration information indicative of for how long the data identifying the physical location is deemed valid. The processor utilizes the information to determine a physical location referenced by the name of the geoshortcut.

In one or more illustrative examples, a system for sharing location information, includes a storage configured to maintain a database of geoshortcuts, each geoshortcut including data indicative of a physical location and a name for referencing the physical location. The system also includes a processor, in communication with the storage. The processor is programmed to receive, from a first client device, a name of a geoshortcut, an indication of a location of the geoshortcut, and expiration data indicative of expiration of the location of the geoshortcut and convert a format of the location as received into a predefined location format. The processor is also programmed to store a record in the database of geoshortcuts, the record specifying the name, the location as received, the location in the predefined location format, and expiration data indicative of expiration of the location of the geoshortcut, and receive a request for location information, from a second client device, the request including the name of the geoshortcut. The processor is also programmed to access the database of geoshortcuts to retrieve the record, and send the record as retrieved to the second client device.

In one or more illustrative examples, a method for sharing location information includes receiving an indication of a physical location specified as a name of a geoshortcut, identifying the name as corresponds to the geoshortcut according to a format of the name matching a format of geoshortcut name identifiers, and sending the name, to a cloud server maintaining a geoshortcut service, in a request for geoshortcut information regarding the geoshortcut. The method further includes receiving, the geoshortcut information regarding the geoshortcut from the cloud server responsive to the request, the geoshortcut information including data identifying the physical location in a native format as received, data identifying the physical location in a predefined location format available across geoshortcuts, and expiration data indicative of for how long the data identifying the physical location is deemed valid. The method also includes utilizing the geoshortcut information to determine the physical location referenced by the name of the geoshortcut.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications.

A geoshortcut refers to a user-defined name and underlying data that can be expressed between users as well as different applications. The geoshortcut may be defined according to a universal format. Through use of a universal format, location may be easily communicated across different applications and devices. For example, similar to how a web-site address could be saved as a favorite (or "shortcut") with a custom name, an entity in space can be labeled and referred to using a geoshortcut. As described herein, this formatted approach both simplifies defining a precise position, and also provides a meaningful name for locations. Moreover, the format allows for user re-definition of the location to handle dynamically-changeable locations and provides support for a sharing infrastructure. An internet-based service may be provided to define, store, share, and programmatically retrieve these locations. Thus, the described approach is an application-agnostic, global, standardized way to define and share locations, independent of application or device.

Figure 1:
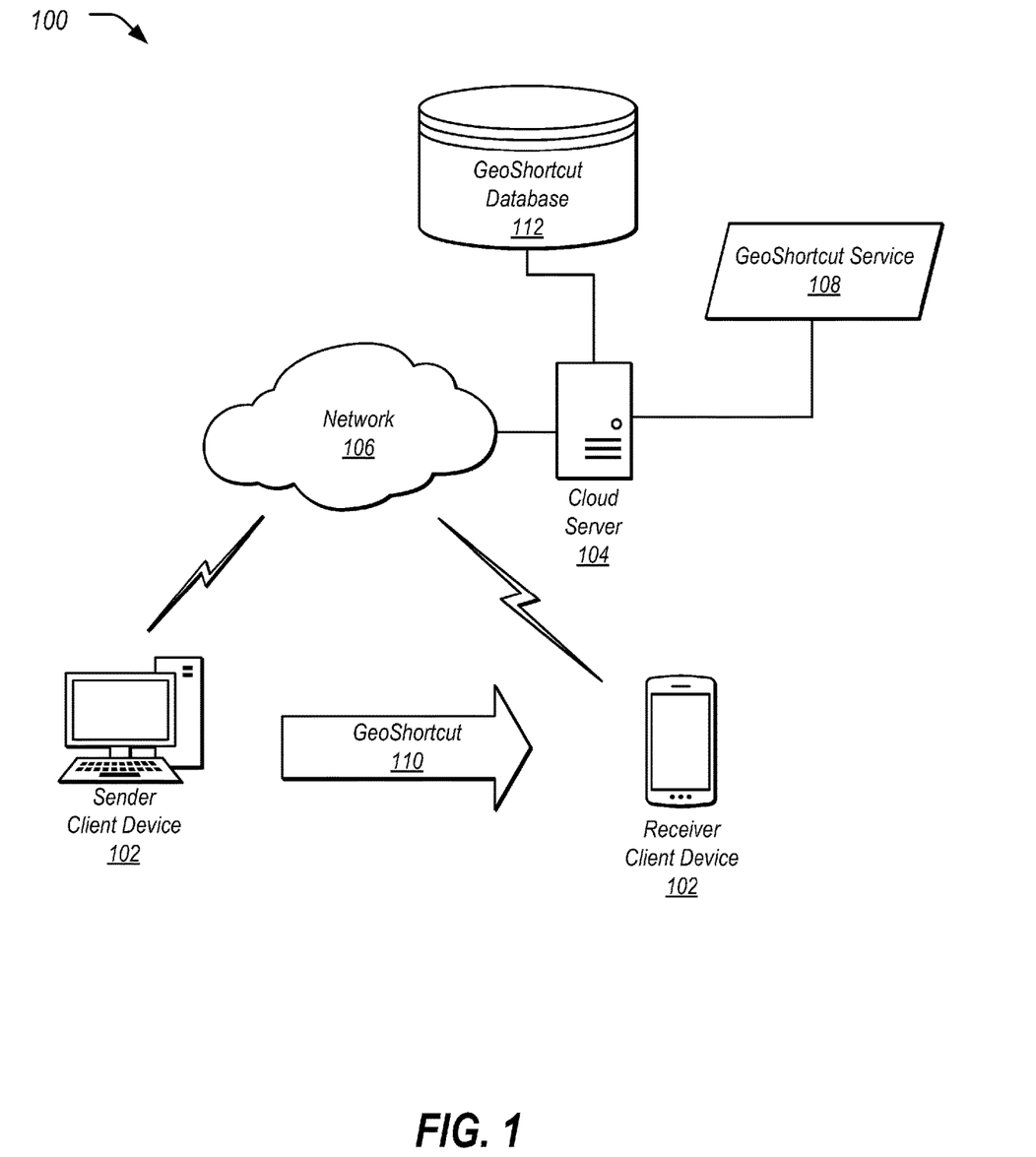
FIG. 1 illustrates an example system for the definition and sharing of geoshortcuts.

FIG. 1 illustrates an example system 100 for the definition and sharing of geoshortcuts 110. The system 100 includes a cloud server 104 that hosts a geoshortcut service 108 and that maintains a geoshortcut database 112 of geoshortcut 110 information. The geoshortcut service 108 is accessible to client devices 102 over a network 106. It should be noted that the example system 100 is one example, and other systems 100 may be used. For instance, while two client devices 102 are shown, systems 100 including many more client devices 102 are contemplated. As another possibility, while the example implementation is shown as a client-server system, other system architectures such as a distributed network or an ad-hoc network may be used.

The client devices 102 may be any of various types of portable computing device, such as cellular phones, tablet computers, smart watches, laptop computers, portable music players, or other devices having processing and communications capabilities. As some other examples, the client devices 102 may include in-vehicle infotainment sources, such as center stack or rear-seat infotainment systems. The cloud server 104 may also be a computing device, such as one or more hardware servers or server instances maintained by a cloud service provider.

Figure 2:
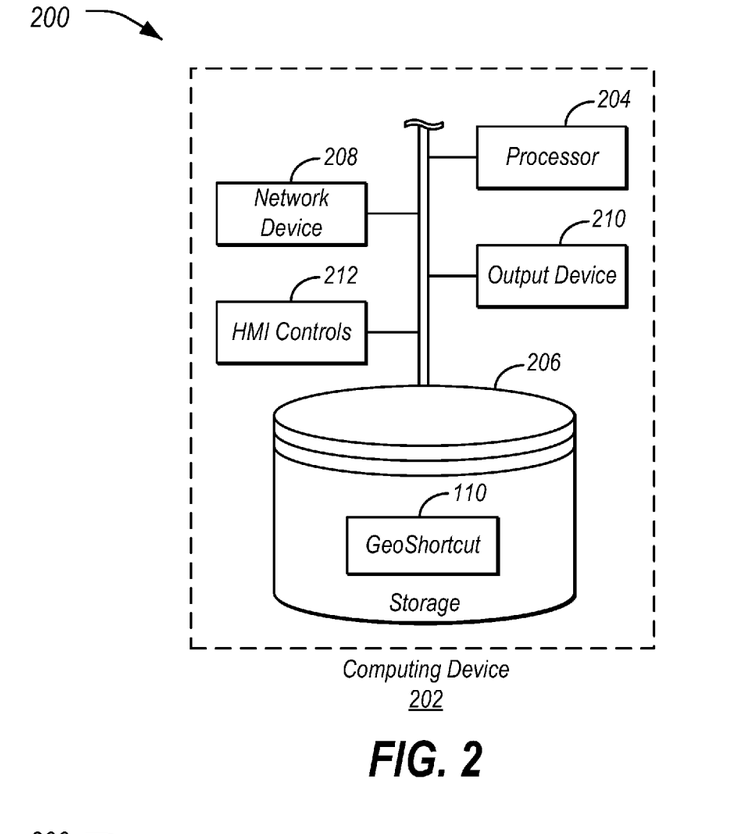
FIG. 2 illustrates an example computing device.

FIG. 2 illustrates an example 200 of a computing device 202. Referring to FIG. 2, and with continuing reference to FIG. 1, the client device 102 and cloud server 104 may be examples of such computing devices 202. As shown, the computing device 202 may include a processor 204 that is operatively connected to a storage 206, a network device 208, an output device 210, and human-machine interface (HMI) controls 212. It should be noted that this is merely an example, and computing devices 202 with more, fewer, or different components may be used.

Each of the processor 204 of the cloud server 104 and the processor 204 of the client device 102 may include one or more integrated circuits that implement the functionality of a central processing unit (CPU) and/or graphics processing unit (GPU). In some examples, the processors 204 are a system on a chip (SoC) that integrates the functionality of the CPU and GPU. The SoC may optionally include other components such as, for example, the storage 206 and the network device 208 into a single integrated device. In other examples, the CPU and GPU are connected to each other via a peripheral connection device such as PCI express or another suitable peripheral data connection. In one example, the CPU is a commercially available central processing device that implements an instruction set such as one of the x86, ARM, Power, or MIPS instruction set families.

Regardless of the specifics, during operation, the processor 204 executes stored program instructions that are retrieved from the storage 206. A location application that is used to share geoshortcuts 110 may be an example of such a program. The stored program instructions accordingly include software that controls the operation of the processors 204 to perform the operations described herein. The storage 206 may include both non-volatile memory and volatile memory devices. The non-volatile memory includes solid-state memories, such as NAND flash memory, magnetic and optical storage media, or any other suitable data storage device that retains data when the system 100 is deactivated or loses electrical power. The volatile memory includes static and dynamic random-access memory (RAM) that stores program instructions and data during operation of the system 100.

The GPU of the client device 102 may include hardware and software for display of at least two-dimensional (2D) and optionally three-dimensional (3D) graphics to the output device 210 of the client device 102. The output device 210 may include a graphical or visual display device, such as an electronic display screen, projector, printer, or any other suitable device that reproduces a graphical display. As another example, the output device 210 may include an audio device, such as a loudspeaker or headphone. As yet a further example, the output device 210 may include a tactile device, such as a mechanically raiseable device that may, in an example, be configured to display braille or another physical output that may be touched to provide information to a user.

The HMI controls 212 may include any of various devices that enable the client device 102 of the system 100 to receive control input from users. Examples of suitable input devices that receive human interface inputs may include keyboards, mice, trackballs, touchscreens, voice input devices, graphics tablets, and the like.

The network devices 208 may each include any of various devices that enable the cloud server 104 and client devices 102, respectively, to send and/or receive data from external devices over the network 106. Examples of suitable network devices 208 include an Ethernet interface, a Wi-Fi transceiver, a cellular transceiver, or a BLUETOOTH or BLUETOOTH Low Energy (BLE) transceiver, or other network adapter or peripheral interconnection device that receives data from another computer or external data storage device, which can be useful for receiving large sets of data in an efficient manner.

Referring back to FIG. 1, the geoshortcut service 108 may be an example of a public (e.g., Internet-facing) service that exists as a software application executed by the cloud server 104. When executed, the geoshortcut service 108 may use various algorithms to perform aspects of the operations described herein. In an example, the geoshortcut service 108 may include instructions executable by the processor 204 of the cloud server 104 as discussed above. Computer-executable instructions may be compiled or interpreted from computer programs created using a variety of programming languages and/or technologies, including, without limitation, and either alone or in combination, JAVA, C, C++, C#, VISUAL BASIC, JAVASCRIPT, PYTHON, PERL, PL/SQL, etc. In general, the processor 204 receives the instructions, e.g., from the storage 206, a computer-readable medium, etc., and executes these instructions, thereby performing one or more processes, including one or more of the processes described herein. Such instructions and other data may be stored and transmitted using a variety of computer-readable media.

Figure 3:
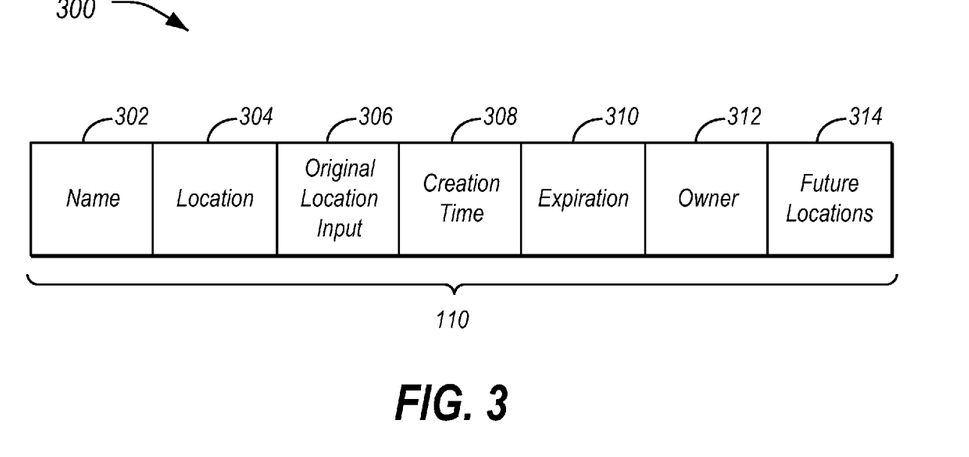
FIG. 3 illustrates an example data structure for a geoshortcut.

Referring to the example 300 shown in FIG. 3, and with continued reference to FIG. 1, a geoshortcut 110 refers to a labeled entity in space, where the location may be referred to using a name or other user-defined phrase. This accordingly allows the underlying data to be expressed between people as well as different applications by referencing the name. The geoshortcut 110 is defined according to a structure. As shown, an example geoshortcut 110 includes a name 302, a location 304, an original location input 306, a creation time 308, an expiration 310, and owner 312, and future locations 314. This structure accordingly includes information descriptive of the labeled entity such as a shortcut name, a user-defined location (which may be dynamic or static), and (optionally) a duration of time where the shortcut-location combination is active. The structure stores a basic, but precise, representation of location (e.g., in terms of latitude/longitude or some other representation) as well as a reference to how the location was determined.

The name 302 is a globally unique string or other readily-identifiable name that is designed to be understandable and to be easily shared between users, either person-to-person, or on printed and electronic material. In an example, the name 302 may be identifiable as being a label of a geoshortcut 110 due to the use of a predefined prefix or other modifier that allows users and devices to recognize the name 302 it as a name 302 of a geoshortcut 110. In one non-limiting example, the name 302 of a geoshortcut 110 may include the prefix "L&" followed by the name using the format "L&TagName". In one example, "L&AutoTechShop" may be a name 302 of a geoshortcut 110. The name 302 may be defined by the creator of the geoshortcut 110 and may be used as a hash or unique identifier for looking up the location information of the geoshortcut 110 in the geoshortcut database 112 of the cloud server 104.

The location 304 is data that indicates a precise location that is identified by the geoshortcut 110. In many examples, the location 304 is specified in a predefined format across all geoshortcuts 110 to facilitate application use of the data. In one specific example, the location 304 is specified in a latitude and longitude format.

The original location input 306 is information that indicates the location 304 as originally-entered by the user. When defining this location, the geoshortcut service 108 may allow a user to use various methods of specifying a location to define the location 304 of the geoshortcut 110. As some examples, these may include, but are not limited to, dropping a pin on a map, a street address, a plus code, or using automatic device location services. By providing for different ways to receive location information, input for creation of the geo shortcuts 110 becomes application-agnostic since a cloud-side parser of the geoshortcut service 108 may be programmed to interpret the input and genericize it into the predefined format used by the geoshortcut 110.

As noted, the location input may be interpreted into a common format to be saved as the location 304. However, the location as originally-defined by the user may also be stored as the original location input 306. This allows applications that use the geoshortcut service 108 to programmatically provide additional benefits. A client device 102 receiving the geoshortcut 110 data could investigate the original location input 306 field, and, if successful in parsing it, could use that information rather than the interpreted location 304.

As one example, if a point of interest (POI) service, such as FourSquare, allows a user to automatically create a geoshortcut 110 as part of defining a new POI, the actual FourSquare POI unique resource identifier (URI) may be stored as the original location input 306. If the user uses a FourSquare-enabled navigation client and enters the geoshortcut name 302 for a business, then the navigation client could realize that the geoshortcut 110 data does not only hold the location 304, but it also links to a FourSquare listing. Thus, the application could retrieve operating hours for that location as well as other information.

As another example, a user uses the What3Words application to find the "///" location of a specific place. Instead of searching for a POI, the user may enter a name 302 of a geoshortcut 110, such as "L&TechShop". The What3Words application may recognize this as a geoshortcut 110 and may query the cloud server 104 for the geoshortcut 110 information. The location 304 field of the geoshortcut 110 retrieved from the cloud server 104 may contain a coordinate representation (e.g., 42.2977, −83.2016) that may be used to look up the "///" location name. However, the application may also examine the original location input 306 field of the geoshortcut 110, and may realize that the field includes a What3Words location (e.g., "///after.works.actual"). Accordingly, the What3Words application may use the original location input 306 instead. However, if the user enters the same name of the geoshortcut 110, in this example "L&TechShop", into a mapping application, that application may use the coordinates from the location 304 field to present a pin on the map, but may use the information in the original location input 306 field (e.g., "///after.works.actual" in this example) as a name or sub-name (e.g., instead of or in addition to "L&TechShop") as a description of the pin on the map.

The creation time 308 field includes a timestamp or other information indicative of when the geoshortcut 110 was created. A non-limiting example may be data in a format such as "2017-04-23T07:14:34Z." If the geoshortcut 110 is updated, the creation time 308 field may additionally or alternately include information indicative of when the geoshortcut 110 was updated. The creation time 308 field may also be used to aid in determining if a locally-stored version of the geoshortcut 110 information should be updated. For instance, if the creation time 308 field indicates that the geoshortcut 110 is older than a predefined amount of time, the client device 102 may request the cloud server 104 to again provide the data fields for the geoshortcut 110.

The expiration 310 field defines how long the information mapped by the geoshortcut 110 is valid or accessible. In one example, there may be three types of geoshortcuts 110: static geoshortcuts 110, mobile geoshortcuts 110, and dynamic geoshortcuts 110. Notably, static geoshortcuts 110, mobile geoshortcuts 110, and dynamic geoshortcuts 110 may all be represented by the same structure, only with different values used for the expiration 310 field. Thus, static, mobile and dynamic locations may be consumed by applications in a similar way. However, by understanding the type of geoshortcut 110 through the use of the expiration 310 field, the consuming applications may use the expiration information, for example, to understand when to perform a refresh of the data of the geoshortcut 110.

Static geoshortcuts 110 refer to locations that are never expected to change. These represent geographical locations such as a square, a house or a named place. A static geoshortcut 110 may indicate a predefined value in the expiration 310 field, such as "static", "indefinite", "0", "−1" or a maximum value or another value that indicates that the static geoshortcuts 110 is expected not to change in location. Note that a static geoshortcut 110 may still be updated (e.g., my work location), but that may be on a case-by-case basis. Absent additional action, a static geoshortcut 110 does not expire.

For instance, because of traffic and long lines during peak hours, a gas station of a warehouse goods store may label an ideal gas station entrance so that the gas queue does not interfere with the parking lot queue. The data for this geoshortcut 110 may accordingly indicate a name 302 (e.g., L&WarehouseGasSpringfield, a location 304 (e.g., 42.380639, −83.332844), and an expiration 310 of indefinite.

Mobile geoshortcuts 110 refer to locations that stay for periods of time at the same location but are expected to move around between multiple locations. The mobile geoshortcut 110 may, accordingly, include both the creation time 308 and an expected expiration date in the expiration 310 field. As such mobile locations may follow a schedule, the mobile geoshortcuts 110 may additionally include a future location of the geoshortcut 110 that is defined in the future locations 314 field. Examples of locations where a mobile geoshortcut 110 may be useful include food trucks, mobile libraries, mobile health vans, and so on.

When a geoshortcut 110 is created, a password may also be provided to allow for future updates of the geoshortcut 110, allowing future updates of the location behind a specific geoshortcut 110. This could, for example, be used by a Food Truck that automatically updates its location every day so that users easily could find it, wherever it is (e.g., a user could enter "L&OinkMooBBQTruck" to be directed to the location of the food truck, wherever it was parked for the day), and with the expiration 310 field indicating how long it will be there.

With respect to the expiration value of the mobile geoshortcut 110, for mobile locations, there may be an expected time when the location 304 (and also original location input 306) is no longer valid. That expected time may be captured in the expiration 310 field. Once the geoshortcut 110 expires (meaning the time indicated by the expiration 310 has passed), a record for the geoshortcut 110 may still be maintained on the cloud server 104 to reserve the shortcut name 302, but when information about it is retrieved, the client device 102 may either be informed by the cloud server 104 that the geoshortcut 110 has expired (e.g., meaning the location 304 and original location input 306 data may be stale), or the cloud server 104 may return a NULL value for the location if the creator (or the system 100 in general) does not want a potentially stale last-known-good location to be provided.

In some examples, as an extension to the geoshortcut 110, additional information may be provided in the geoshortcut 110 to provide an option to specify a default location, that could be used whenever the current location expires. For instance, a default location field (not shown) may be used for this purpose. As yet another example, a user may specify future locations 314 in the geoshortcut 110 as a list of (start/end/location/original location input) tuples. The system 100 may automatically update the current location 304 (and creation time 308, expiration 310, and original location input 306) based on that, or client devices 102 could use this information directly.

Continuing with the food truck example, a food truck may be on the move, setting up in different spots and posting where it will be on social media or a company calendar. Instead of managing different posts, the food truck can put its dynamic location into a geoshortcut 110 and set the visibility to be during defined food service hours. Then, customers can track the truck when they want to, and the truck can broadcast a default/inactive location when it is not in business for the day. The truck can also manually schedule and/or define its locations ahead of time, so that customers will know when, where, and how long a truck will be in a location for the rest of the month, rather than referring to static food listings on an online map that is likely to be inaccurate.

As one example of such a geoshortcut 110, since the truck is inactive, the location shows the last known location, but it is indicated as expired. For instance, the name 302 may be specified (e.g., "L&OinkMooBBQTruck"), a location 304 may be specified (e.g., 42.329480, −83.077429), an expiration 310 may be specified (expired), and future locations 314 may be specified (e.g., 2019-05-23T10:00:00-2019-05-23T16:00:00 [42.3147,−83.2071]; 2019-05-28T11:00:00-2019-05:28T14:00:00 [42.3058,−83.1795] (Repeated Weekly)), Dynamic geoshortcuts 110 represent objects or people that move around without a predefined schedule. They can be used, e.g., to track a current location of a delivery truck, a current location of railroad cart or a last known location of a person. Since the concept of a duration is inapplicable to a dynamic geoshortcut 110, the creation time 308 field may indicate when the object referenced by the geoshortcut 110 was at the indicated location 304. To indicate this meaning of the creation time 308 and location 304 fields, the expiration 310 field may include NULL, or another predefined value such as "DYNAMIC" to indicate that the geoshortcut 110 is a dynamic geoshortcut 110. For a dynamic location, the geoshortcut 110 may be tied to a moving, location-service enabled point, such as a mobile phone or a global satellite navigation equipped beacon. Accordingly, the endpoint may be configured to update the location 304 of the geoshortcut 110 with a predefined cadence/frequency. The expiration 310 may be used by client devices 102 to understand the approximate freshness of the location, e.g., when the location 304 may be stale and should be requested again from the cloud server 104.

As a dynamic shortcut example, James is a realtor and always on the move, but he wants his colleagues and clients to be able to know where he is. He therefore installs a "Share my Position" app on his phone. He creates an account and sets up a dynamic geoshortcut 110 named "L&RealtorJames". He sets up his app to update his location whenever he is working (weekdays 9 am-5 pm). The application may then determine his location from the phone and sends an update request to the geoshortcut service every hour, or whenever he has moved more than a mile from the last updated location. The geoshortcut 110 data may specify, for example, a name 302 of "L&RealtorJames", a location 304 of "42.380639, −83.332844), a creation time 308 of 2019-04-19T09:24:23, and an expiration 310 indicative of the geoshortcut 110 being a dynamic geoshortcut.

Referring back to FIG. 1, the geoshortcut database 112 may store the data for the geoshortcuts 110, and may be accessible under the control of the geoshortcut service 108. The geoshortcut service 108 may, accordingly, be the backbone for use of geoshortcuts 110. The geoshortcut service 108 may provide a web interface for allowing users to manually manage the geoshortcuts 110 stored to the geoshortcut database 112. Management of the geoshortcuts 110 may include operations such as to add, edit, update, and delete geoshortcuts 110. The geoshortcut service 108 may additionally or alternately provide an application interface (such as a Representational State Transfer (REST) application programming interface (API)) to allow applications to programmatically manage the geoshortcuts 110. The geoshortcuts 110 may be tied to accounts on the cloud server 104, e.g., utilizing various Internet authentication technologies (e.g., OAuth2) to manage accounts and application access. In some examples, geoshortcuts 110 may be publicly accessible via the geoshortcut service 108 for reading, but password-protected for writing, depending on service implementation.

Figure 4:
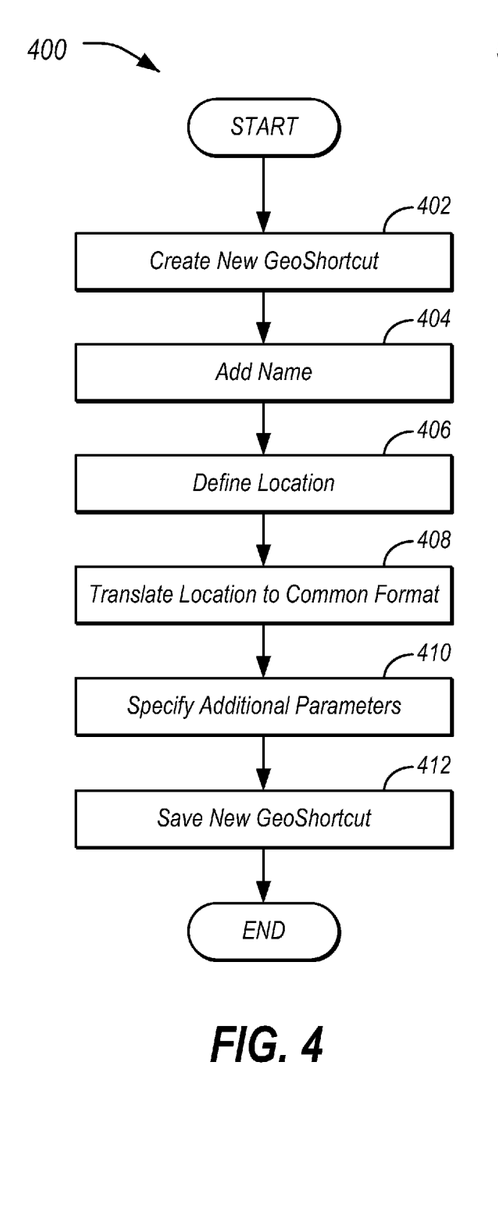
FIG. 4 illustrates an example process for the creation of a geoshortcut.

FIG. 4 illustrates an example process 400 for the creation of a geoshortcut 110. In an example, the process 400 may be performed by the geoshortcut service 108 in the context of the elements of the system 100 discussed in detail above.

At operation 402, an indication to create a new geo shortcut 110 is received. As some examples, a user may open a geoshortcut application or another location application or a website using a client device 102 and may log into the geoshortcut service 108 of the cloud server 104. The geoshortcut service 108 may further receive an indication from the user to create a new geoshortcut 110.

A name 302 is specified for the geoshortcut 110 at 404. In an example, the geoshortcut service 108 may receive a name 302 of the geoshortcut 110 from the client device 102. The geoshortcut service 108 may further validate the name 302 to ensure that is not already the name 302 of an existing or old geoshortcut 110 saved to the geoshortcut database 112, and may prompt the user to specify a different name 302 (or to confirm that the user wishes to instead edit an existing geoshortcut 110 as described instead in FIG. 5).

At 406, a location is defined for the geoshortcut 110. As some examples, the geoshortcut service 108 may receive, from the client device 102, the location as coordinates, an indication of a selection on a map, or via an alternative addressing scheme (e.g., a What3Words location).

At operation 408, the location for the geoshortcut 110 is translated into a common format. In an example, the geoshortcut service 108 may translate the location received at operation 406 into a common format, such as a latitude/longitude format.

Additional parameters of the geoshortcut 110 are specified at operation 410. In an example, the geoshortcut service 108 receives further information regarding the geoshortcut 110 from the client device 102, such as expiration 310 information, and future locations 314 information.

At 412, the geoshortcut 110 is saved. In an example, the geoshortcut service 108 saves geoshortcut 110 to the geoshortcut database 112. The saved information may include the name 302, the original input location 306 as received, the location 304 as translated into the common format, a creation time 308 of the creation of the geoshortcut 110, expiration 310 information, the owner 312 of the geoshortcut 110 (e.g., the user who created the geoshortcut 110), and any future locations 314 information. After operation 412, the process 400 ends.

Figure 5:
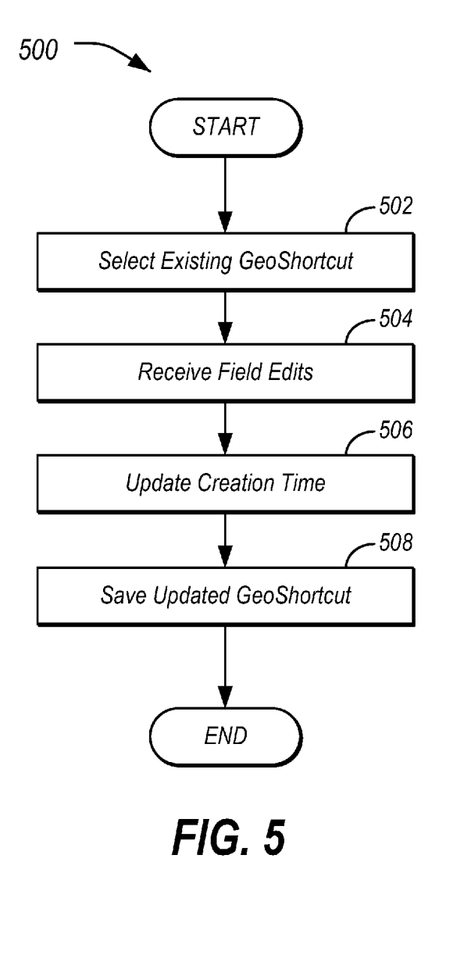
FIG. 5 illustrates an example process for the editing of a geoshortcut.

FIG. 5 illustrates an example process 500 for the editing of a geoshortcut 110. In an example, the process 500 may be performed by the geoshortcut service 108 in the context of the elements of the system 100 discussed in detail above.

At operation 502, an indication to edit an existing geoshortcut 110 is received. As some examples, a user may open a geoshortcut application or another location application or a website using a client device 102 and may log into the geoshortcut service 108 of the cloud server 104. The geoshortcut service 108 may further present a list of existing geoshortcuts 110 owned by the logged-in user and receive an indication from the user to edit one of the geoshortcuts 110 via selection from the list. As another possibility, the geoshortcut service 108 may present an opportunity to edit an existing geoshortcut 110 as discussed in operation 404, responsive to receiving a duplicate name 302 of a geoshortcut 110.

The geoshortcut service 108 receives edits to the information of the geoshortcut 110 at 504. In an example, the geoshortcut service 108 may provide fields indicating the current information of the geoshortcut service 108 to the client device 102 and may receive edits of the fields from the client device 102.

At operation 506, the geoshortcut service 108 updates the creation time 308 of the geoshortcut 110 to the current time, to indicate that the geoshortcut 110 has been edited. It should be noted that in other implementations, the geoshortcut 110 may include both creation time and last edit time fields, in which case the last edit time field would be updated but the creation time field would not.

At 508, the geoshortcut service 108 saves the updated geoshortcut 110 to the geoshortcut database 112. The saved information may include the updates of operations 504 and 506. After operation 508, the process 500 ends.

Figure 6:
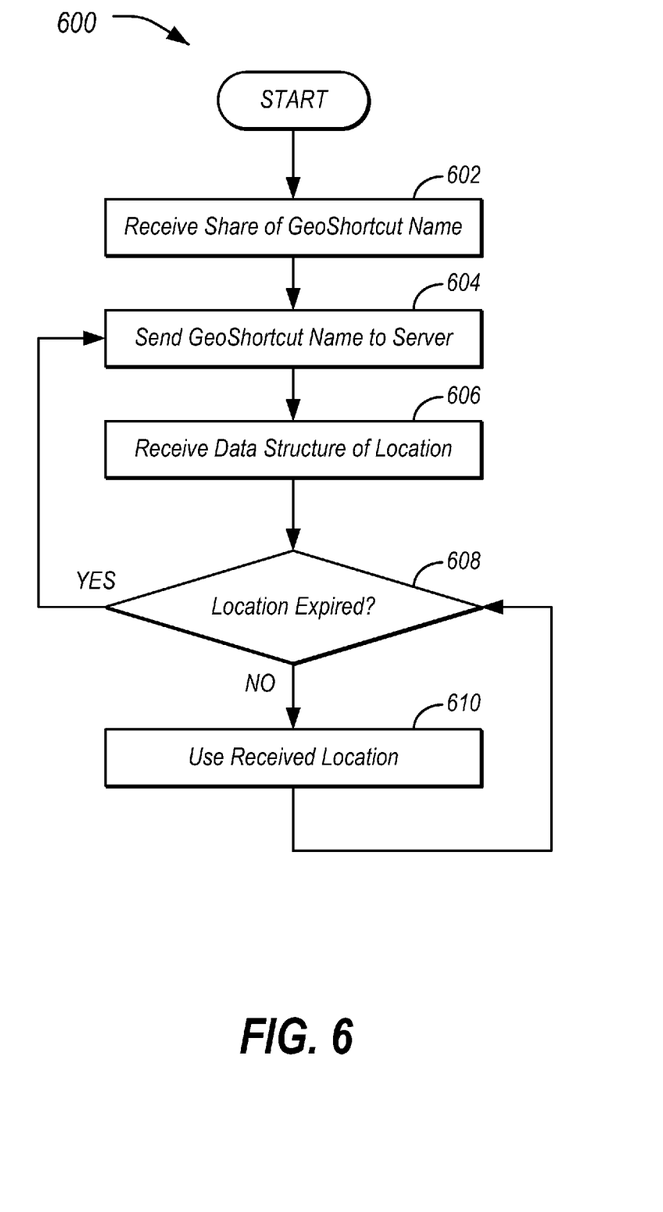
FIG. 6 illustrates an example process for the use of a geoshortcut.

FIG. 6 illustrates an example process 600 for the use of a geoshortcut 110. In an example, the process 600 may be performed by the client device 102 in the context of the elements of the system 100 discussed in detail above.

At operation 602, the client device 102 receives a share of a name 302 of a geoshortcut 110. In an example, a user of a client device 102 may share a geoshortcut 110 name 302 (e.g., a L& tag) with a user of another client device 102. The sharing may be over various communications methods, such as during a phone call, via short message service (SMS) or other messaging service, via email, etc. In another example, the user may enter the geoshortcut 110 name 302 into an application (e.g., a phone application, a desktop computer application, an in-vehicle navigation system, etc.). In yet a further example, the user may provide voice input indicating the geoshortcut 110 name 302 (e.g., "guide me to geoshortcut [name]").

At 604, the client device 102 sends the name 302 of the geoshortcut 110 to the geoshortcut service 108. In an example, the geoshortcut service 108 is hosted by the cloud server 104 and is reachable by the client device 102 over the network 106. The client device 102 may interpret the name 302 as a geoshortcut due to the name 302 matching the predefined format used for geoshortcuts 110 (e.g., the name 302 starts with "L&"). Responsive to the determination, the client device 102 may send the name 302 to the geoshortcut service 108 to fetch the corresponding location information. At 606, the client device 102 receives the geoshortcut 110 location information responsive to the request made at 604.

At operation 608, the client device 102 determines whether the location information of the geoshortcut 110 has expired. In an example, the client device 102 may utilize the expiration 310 field to determine whether the location information (e.g., location 304, original input location 306) is still valid.

In one example, the geoshortcut 110 may be a static geoshortcut 110, and the expiration 310 may be a predefined value indicating that the location information is not expected to change. For such a geoshortcut 110, control passes to operation 610.

In another example, the geoshortcut 110 may be a mobile geoshortcut 110, and the expiration 310 may be a timestamp or other value indicating an expected time at which the location information expires. As such mobile locations may follow a schedule, the mobile geoshortcuts 110 may additionally include a future location of the geoshortcut 110 that is defined in the future locations 314. If, based on the expiration 310, the geoshortcut 110 has not expired (or the geoshortcut 110 has expired but the future locations 314 indicates the location), control passes to operation 610 to use the location information as the physical location referenced by the name 302. If, however, the geoshortcut 110 has expired, control passes to operation 604 to again query the geoshortcut service 108 for the geoshortcut 110 information. This allows the client device 102 to obtain a refreshed copy of the information of the geoshortcut 110.

In a further example, the geoshortcut 110 may be a dynamic geoshortcut 110, and the expiration 310 may be a predefined value indicating that the location information is in relation to a moving, location-service enabled point, such as a mobile phone or GPS-equipped beacon. Accordingly, the endpoint may be configured to update the location 304 of the geoshortcut 110 with a predefined cadence/frequency, and if such a frequency has been met then control passes to operation 604 to refresh the information of the geoshortcut 110. If not, then control passes to operation 610.

At 610, the client device 102 uses the location information of the geoshortcut 110. In an example, the client device 102 may first attempt to use the original input location 306 information if that format is supported by the application needing the physical location. If the format of the original input location 306 information is not supported by the application needing the physical location, then the application needing the physical location may utilize the location 304 converted into the common format. For instance, a navigation system may provide directions to the specified location 304, e.g., on a display screen, as spoken directions, on a braille display, or through some other approach. After operation 610, control passes to operation 608. Or, if the location has already been used, the process 600 may alternately end.

Thus, through use of the formatted name 302 field, geoshortcuts 110 are easily recognizable to applications, websites, embedded systems and other services. Applications may easily query the location information for a geoshortcut 110 from the cloud server 104. Accordingly, a user may enter a name 302 of a geoshortcut 110 into a navigation system, search engine, or rideshare app (as some examples), and that application or system may readily identify that the input refers to a geoshortcut 110, perform a lookup using the geoshortcut service 108, and identify the location corresponding to the geoshortcut 110.

In general, the processes, methods, or algorithms disclosed herein can be deliverable to/implemented by a processing device, controller, or computer, which can include any existing programmable electronic control unit or dedicated electronic control unit. Similarly, the processes, methods, or algorithms can be stored as data and instructions executable by a controller or computer in many forms including, but not limited to, information permanently stored on non-writable storage media such as ROM devices and information alterably stored on writeable storage media such as floppy disks, magnetic tapes, CDs, RAM devices, and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

What is claimed is:

1. A system for sharing location information, comprising:
    a client device having a processor and a memory storing a location application, the processor executing the location application to perform operations including to
        receive an indication of a physical location specified as a name of a geoshortcut,
        send a request for geoshortcut information to a cloud server maintaining a geoshortcut service, the request including the name,
        receive the geoshortcut information from the cloud server responsive to the request, the geoshortcut information including data identifying the physical location in a native format as received to the geoshortcut service, data identifying the physical location in a predefined location format available across geoshortcuts, and expiration data indicative of for how long the data identifying the physical location is deemed valid, and
        utilize the geoshortcut information to determine the physical location referenced by the name of the geoshortcut.

2. The system of claim 1, wherein the expiration data specifies a time after which the data identifying the physical location is no longer valid.

3. The system of claim 1, wherein the expiration data specifies a period of refresh for the data identifying the physical location.

4. The system of claim 3, wherein the client device is further programmed to refresh the geoshortcut information from the cloud server responsive to expiration of the period of refresh for the data identifying the physical location.

5. The system of claim 1, wherein the expiration data specifies a predefined value indicating that the geoshortcut has no expiration time.

6. The system of claim 1, wherein the predefined location format available across geoshortcuts specifies latitude and longitude of the physical location.

7. The system of claim 1, wherein the client device is further programmed to attempt to utilize the physical location in the native format, and if the physical location in the native format is unsupported by the location application, then attempt to utilize the predefined location format available across geoshortcuts.

8. The system of claim 1, wherein geoshortcut name identifiers are formatted as including a predefined prefix followed by the name, and the client device is further programmed to identify the name as corresponding to the geoshortcut due to the name including the predefined prefix.

9. The system of claim 1, wherein the client device is further programmed to send an updated physical location for the geoshortcut to the cloud server, to cause the geoshortcut service to update the data identifying the physical location in the native format as received to the geoshortcut service and the data identifying the physical location in the predefined location format available across geoshortcuts.

10. A system for sharing location information, comprising:

a storage configured to maintain a database of geoshortcuts, each geoshortcut including data indicative of a physical location and a name for referencing the physical location; and a processor, in communication with the storage, programmed to receive, from a first client device, a name of a geoshortcut, an indication of a location of the geoshortcut, and expiration data indicative of expiration of the location of the geoshortcut, convert a format of the location as received into a predefined location format, store a record in the database of geoshortcuts, the record specifying the name, the location as received, the location in the predefined location format, and expiration data indicative of expiration of the location of the geoshortcut, receive a request for location information, from a second client device, the request including the name of the geoshortcut, access the database of geoshortcuts to retrieve the record, and send the record as retrieved to the second client device.

11. The system of claim 10, wherein the expiration data specifies a time after which the geoshortcut is no longer valid.

12. The system of claim 10, wherein the expiration data specifies a period of refresh, to cause the second client device to again request the location information from the processor responsive to expiration of the period of refresh.

13. The system of claim 10, wherein the expiration data specifies a predefined value indicating that the geoshortcut has no expiration time.

14. The system of claim 10, wherein the predefined location format available across geoshortcuts specifies latitude and longitude.

15. A method for sharing location information comprising:

receiving an indication of a physical location specified as a name of a geoshortcut, identifying the name as corresponds to the geoshortcut according to a format of the name matching a format of geoshortcut name identifiers, sending the name, to a cloud server maintaining a geoshortcut service, in a request for geoshortcut information regarding the geoshortcut, receiving, the geoshortcut information regarding the geoshortcut from the cloud server responsive to the request, the geoshortcut information including data identifying the physical location in a native format as received, data identifying the physical location in a predefined location format available across geoshortcuts, and expiration data indicative of for how long the data identifying the physical location is deemed valid, and utilizing the geoshortcut information to determine the physical location referenced by the name of the geoshortcut.

16. The method of claim 15, wherein the expiration data specifies one of:

a time after which the physical location of the geo shortcut is no longer valid;

a period of refresh for the physical location of the geoshortcut; or that the geoshortcut has no expiration time.

17. The method of claim 16, further comprising refreshing the geoshortcut information from the cloud server responsive to expiration of the period of refresh for the physical location of the geoshortcut.

18. The method of claim 15, further comprising:

specifying the predefined location format available as a latitude and longitude of the physical location;

attempting to utilize the physical location in the native format; and responsive to the physical location in the native format being unsupported, attempting to utilize the predefined location format available across geoshortcuts.

19. The method of claim 15, wherein the format of geoshortcut name identifiers includes a predefined prefix, followed by the name.

20. The method of claim 19, further comprising sending an updated physical location for the geoshortcut to the cloud server, causing the geoshortcut service to update the data identifying the physical location in the native format as received to the geoshortcut service and the data identifying the physical location in the predefined location format available across geoshortcuts.

* * * * *